Nov. 6, 1962  J. H. ALLEN  3,062,012
DETECTION OF LEAKS FROM UNDERGROUND STORAGE CAVERNS
Filed Sept. 12, 1957
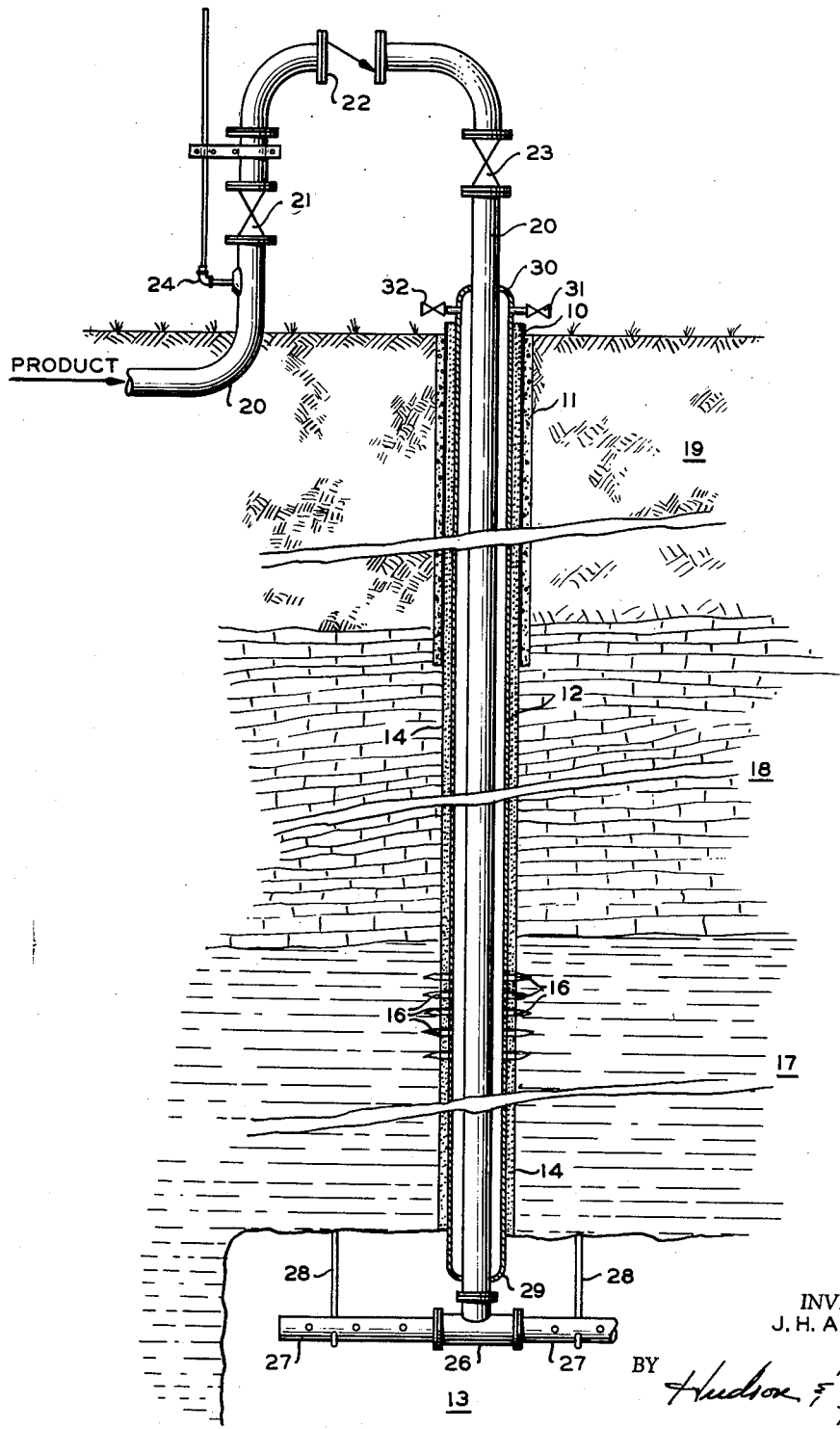
INVENTOR.
J. H. ALLEN
BY *Hudson & Young*
ATTORNEYS.

United States Patent Office 3,062,012
Patented Nov. 6, 1962

3,062,012
DETECTION OF LEAKS FROM UNDERGROUND STORAGE CAVERNS
James H. Allen, Bartlesville, Okla., assignor to Phillips Petroleum Company, a corporation of Delaware
Filed Sept. 12, 1957, Ser. No. 683,568
5 Claims. (Cl. 61—.5)

This invention relates to an apparatus which permits the detection of leaks from an underground storage cavern about a service pipe entering the cavern. In another aspect this invention relates to a method of detecting leaks from an underground storage cavern. In still another aspect it relates to a method of providing an access to an underground storage cavern in such a manner that leaks of product from said cavern can be detected and the contamination of overlying formations can be prevented.

In the storage of volatile products such as liquefied petroleum gases, propane and butane, ethylene or ammonia under pressure in underground storage caverns there is an ever-present danger of leakage of the stored product at the points at which service pipes enter the cavern. It is generally desirable in such installations to have a number of filling and removal units entering the cavern at various locations. These underground storage caverns are formed in impervious formations such as shale or salt and there is relatively little danger of products stored therein leaking from the cavern except at those points at which the formation has been pierced to provide the entry of service pipes into the cavern. Although such pipes are encased and cemented to the surrounding formation, these points of entry still represent the weakest spots in the cavern structure. In addition to the loss of valuable product a still greater hazard exists in the pollution of useful minerals such as domestic water which may be present in overlying formations.

According to my invention suitable access to an underground storage cavern is provided which embodies adequate means for detecting leaks of product from the cavern along said access and also enables the interception of any such leakage to prevent the contamination of higher formations. The access of my invention is formed by providing a sealed outer pipe with a concrete sheath about the service pipe at the point at which said service pipe enters the cavern and along said service pipe in the adjacent formation. Perforations are provided through the outer pipe and outer concrete sheath into the adjacent formation. Leakage from the cavern can then be detected by sampling the contents of the annular space between the service pipe and the outer pipe. The particular structure and its method of perforation according to my invention are highly advantageous since only a relatively small diameter hole need be provided for the access. Since the perforations through the outer pipe and sheath and into the formation can be made with bullets or shaped charge perforators which are well-known in the drilling art, there is no need to drill a hole of sufficient size to permit entry of a man.

It is an object of my invention to provide a method of detecting leaks from an underground storage cavern. It is another object of my invention to provide a method and apparatus which will enable the prevention of pollution of upper formations by leaks from an underground storage cavern along the access pipes to said cavern. Another object is to provide a method and apparatus by which product leaking from an underground storage cavern along a service pipe can be intercepted and recovered. Still another object of my invention is to provide in a relatively small diameter hole an adequate means of detecting leaks from an underground cavern along a service pipe in said hole. Other objects, advantages and features of my invention will be apparent to those skilled in the art from the following description, claims and drawing which shows in cross section one application of my invention in connection with a filling pipe to an underground storage cavern.

In providing the improved leak-detecting structure of my invention a hole is first drilled which is somewhat larger than the service pipe which it must accommodate. As pointed out above, a relatively small diameter hole can be drilled for this purpose. It is desirable to drill the hole to the cavern test area before the cavern is excavated. An outer pipe is then positioned in the hole and cemented in place. The cement sheath thus formed provides the seal between the outer pipe and the surrounding formation and will, in most instances, prevent leakage of product around the outer pipe. As additional precaution, however, according to my invention the outer pipe and cement sheath are perforated a suitable distance from the cavern with any conventional well drilling perforating tool, such as bullets or shaped charges. The inner service pipe can then be inserted into the outer pipe and sealed thereto. Product leaking past the cement sheath will enter the annular space between the service pipe and the outer pipe through the perforations thus provided. By sampling the contents of this annular space, any leakage can be quickly detected. If the quantity of leakage is small, the product can be disposed of by burning. If the rate of leakage is relatively high, the product can be recompressed and returned to the cavern for storage.

To further describe the structure of my invention reference is now made to the drawing. As shown, a hole is provided from the surface of the earth to the underground storage cavern. At the surface a casing 10 is cemented in place with concrete 11. The outer pipe 12 is then inserted from the surface of the earth to cavern 13. This outer pipe is cemented into place, thus forming an outer concrete sheath 14 about said outer pipe and sealing same to the surrounding formation.

Perforations 16 are then made through outer pipe 12 and concrete sheath 14 into formation 17 which is adjacent cavern 13. Perforations 16 are preferably formed along several feet of length of pipe 12. For example, about six ½ inch perforations per foot over ten feet is adequate. The cavern itself is formed in impervious formation 17, such as shale or salt, and the perforations should likewise be formed in this impervious formation. In this way any product leaking around the concrete sheath 14 will tend to follow along the drilled hole and enter pipe 12 through perforations 16.

The distance of the perforations from the cavern can vary considerably but there should be sufficient distance that the ceiling of the cavern is not damaged from the shock of forming the perforations. For example, at least 10 feet from the cavern is generally a safe distance and preferably a greater distance is used, for example 30 or 40 feet from the cavern.

Since leakage of product thus described can be intercepted at perforations 16 in formation 17, pollution of minerals which may be present in any intermediate formation 18 or surface formation 19 is prevented. Service pipe 20 can then be inserted into outer pipe 12. In the particular embodiment shown service pipe 20 is a filling unit having a valve 21, check valve 22, valve 23 and relief valve 24 located at the surface. Inside the cavern service pipe 20 is connected by T 26 to filling pipe 27 which is supported from the ceiling of the cavern by hangers 28. Filling pipe 27 is perforated to spray product into the cavern as described in U.S. Patent 2,749,714 issued June 12, 1956, to L. R. Hunter.

When service pipe 20 is in place, ends 29 and 30 of outer pipe 12 are welded to pipe 20 thereby sealing at the cavern and at the surface the annular space between pipes 12 and 20. Valve connections 31 and 32 are provided at the surface end of pipe 12 so that the contents of the annular space between pipes 12 and 20 can be sampled for the presence of stored product; and, in the event that leakage occurs, the product can be withdrawn to prevent the product from entering overlying formations.

While the structure of my invention has been shown in connection with a filling unit, it can readily be seen that its usefulness also extends to the protection of leakage about any type of service pipe and is especially useful where a relatively small diameter hole is desired. For example, in a pumping unit the service pipe can be an outer casing having concentrically arranged discharge pipes inside. This structure can also be used for level measurement or in combination with a vapor relief valve and line positioned in the highest part of the cavern. While the invention is best suited for use in mined caverns, it can also be employed with dissolved or water-washed caverns in which case a mechanical seal such as a threaded plug between the inner and outer pipes would be used at the lower end.

As will be evident to those skilled in the art, various modifications of this invention can be made, or followed, in the light of this foregoing disclosure and discussion, without departing from the spirit or scope thereof.

I claim:

1. A method of providing an access to an underground storage cavern in an impervious formation and protecting overlying formations from contamination with product leaking from said underground storage cavern at the point at which said access enters said cavern which comprises drilling a hole to the cavern depth, inserting an outer pipe in said hole, said outer pipe extending from within said cavern to the surface of the earth, cementing said outer pipe to the surrounding formation thereby forming a concrete sheath on said outer pipe, perforating said outer pipe and sheath along several feet of length in said impervious formation adjacent said cavern but of sufficient distance from said cavern that the cavern ceiling is not damaged during said perforating step, installing a service pipe extending from the surface into said cavern within said outer pipe, welding both ends of said outer pipe to said service pipe thereby forming an annular space open to the formation above said cavern and extending from the region of said cavern to the surface, and sampling the contents of said annular space to detect the presence of said product.

2. A method according to claim 1 wherein product is found in said annular space which comprises continuously withdrawing product from said annular space, thereby preventing contamination of overlying formations.

3. A method according to claim 2 wherein said product from said annular space is burned.

4. A method according to claim 2 wherein said product from said annular space is compressed and returned to said cavern.

5. A method of providing an access to an underground storage cavern located in an impervious formation and protecting overlying formations from contamination with stored product leaking from said cavern along said access which comprises forming a hole from the surface of the earth to said cavern, positioning an outer conduit within said hole in said impervious formation immediately above said cavern, said outer conduit communicating with a point at the surface of the earth, cementing said outer conduit to the surrounding formation forming a concrete sheath thereon, said sheath extending to said cavern and forming the seal between the formation and said access at its point of entry into said cavern, perforating said outer conduit and said sheath at a location within said impervious formation above said cavern, positioning an inner conduit within said hole and within said outer conduit, said inner conduit communicating between said cavern and a point at the surface of the earth, sealing both ends of said outer conduit to said inner conduit, and at least periodically removing material from the annular space between said inner and outer conduits.

References Cited in the file of this patent
UNITED STATES PATENTS

| | | |
|---|---|---|
| 1,987,891 | Cattanach | Jan. 15, 1935 |
| 2,365,794 | Armentrout et al. | Dec. 26, 1944 |
| 2,781,663 | Maly et al. | Feb. 19, 1957 |